UNITED STATES PATENT OFFICE.

RICHARD A. BRIGHT, OF AUBURN, AND ALLEN J. COLWELL, OF PROVIDENCE, RHODE ISLAND, ASSIGNORS, BY MESNE ASSIGNMENTS, TO CIGAR MACHINE CORPORATION OF AMERICA, OF BALTIMORE, MARYLAND, A CORPORATION OF DELAWARE.

CIGAR-BUNCH MACHINE.

1,180,820.  Specification of Letters Patent.  Patented Apr. 25, 1916.

Application filed May 14, 1910, Serial No. 561,481. Renewed September 24, 1915. Serial No. 52,535.

*To all whom it may concern:*

Be it known that we, RICHARD A. BRIGHT, a citizen of the United States, residing at Auburn, in the county of Providence, in the State of Rhode Island, and ALLEN J. COLWELL, of the city of Providence and State of Rhode Island, have jointly invented new and useful Improvements in Cigar-Bunch Machines, of which the following is a specification.

The invention relates more particularly to a machine for sizing the fillers and rolling the binders thereon and has for its object to improve the means for feeding the fillers to the sizing and binding mechanism.

Figure 1:
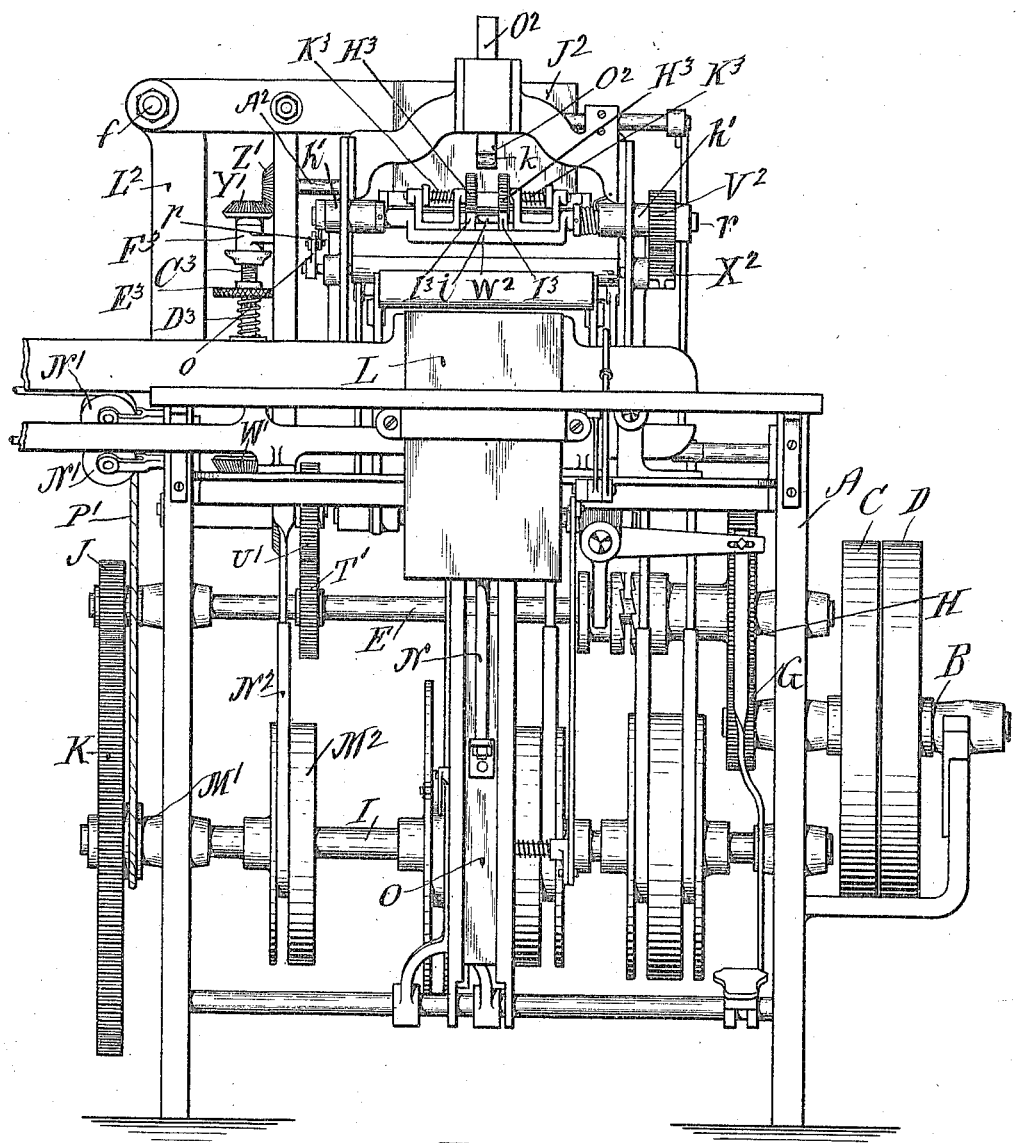
Figure 2:
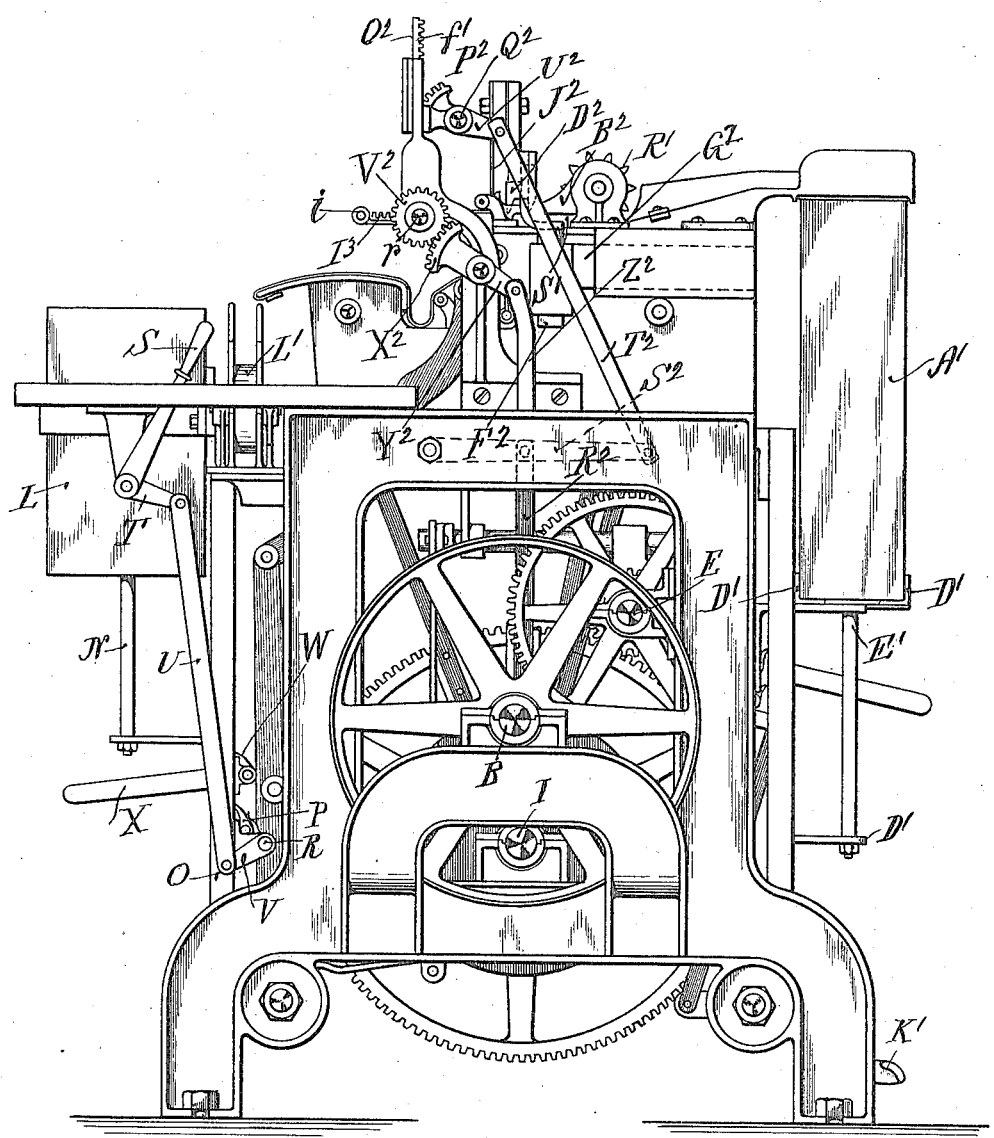
Figure 3:
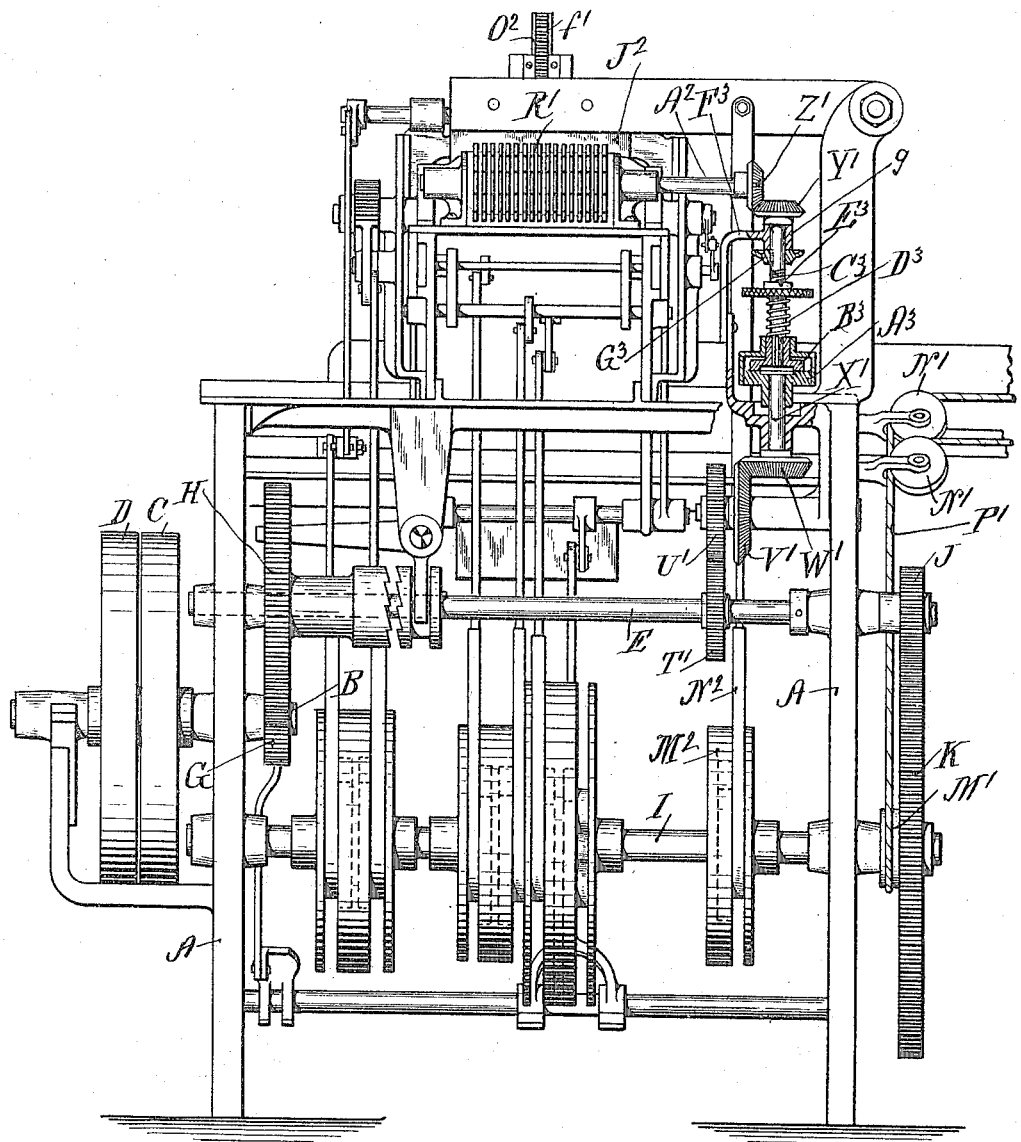
Figure 4:
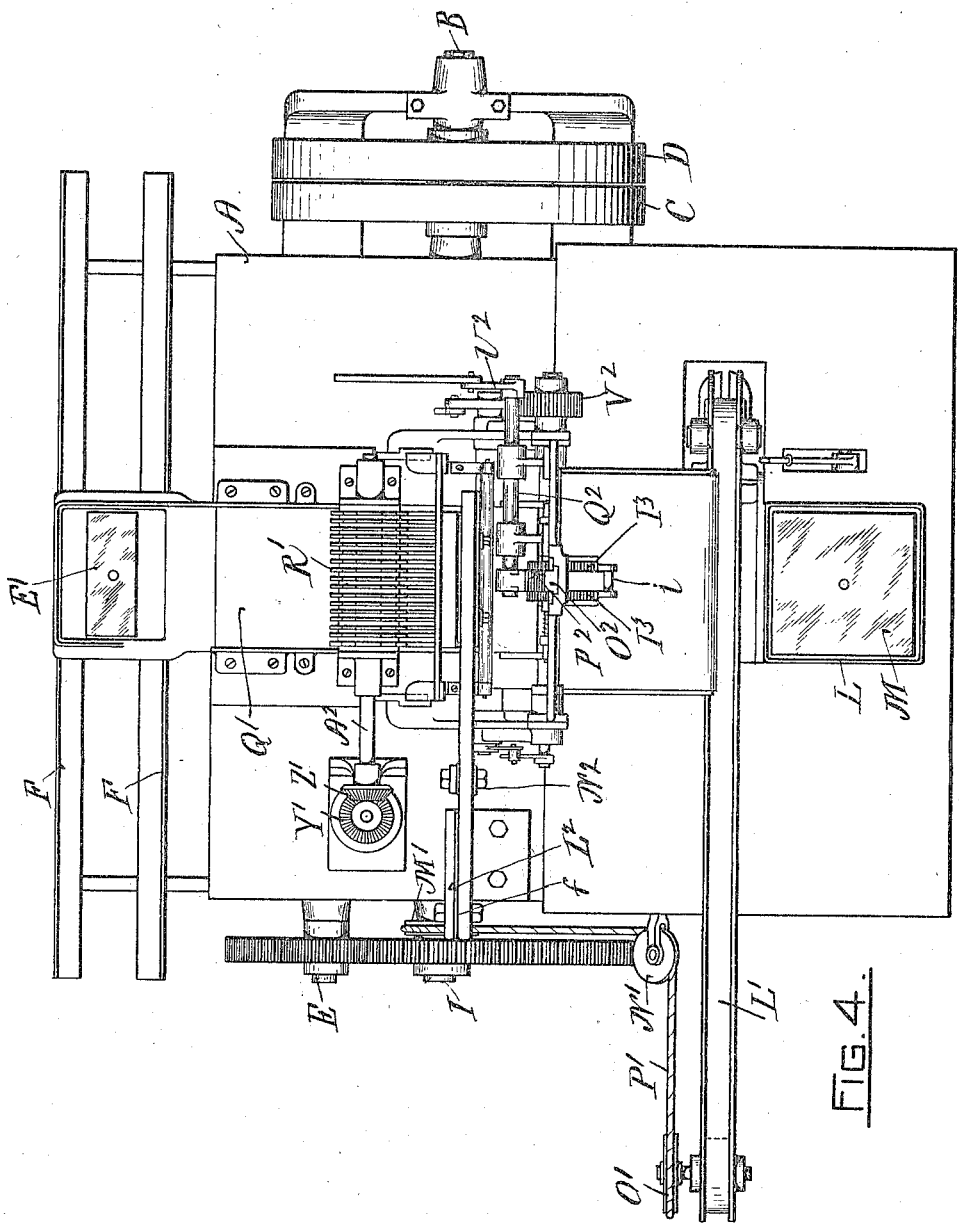
Figure 5:
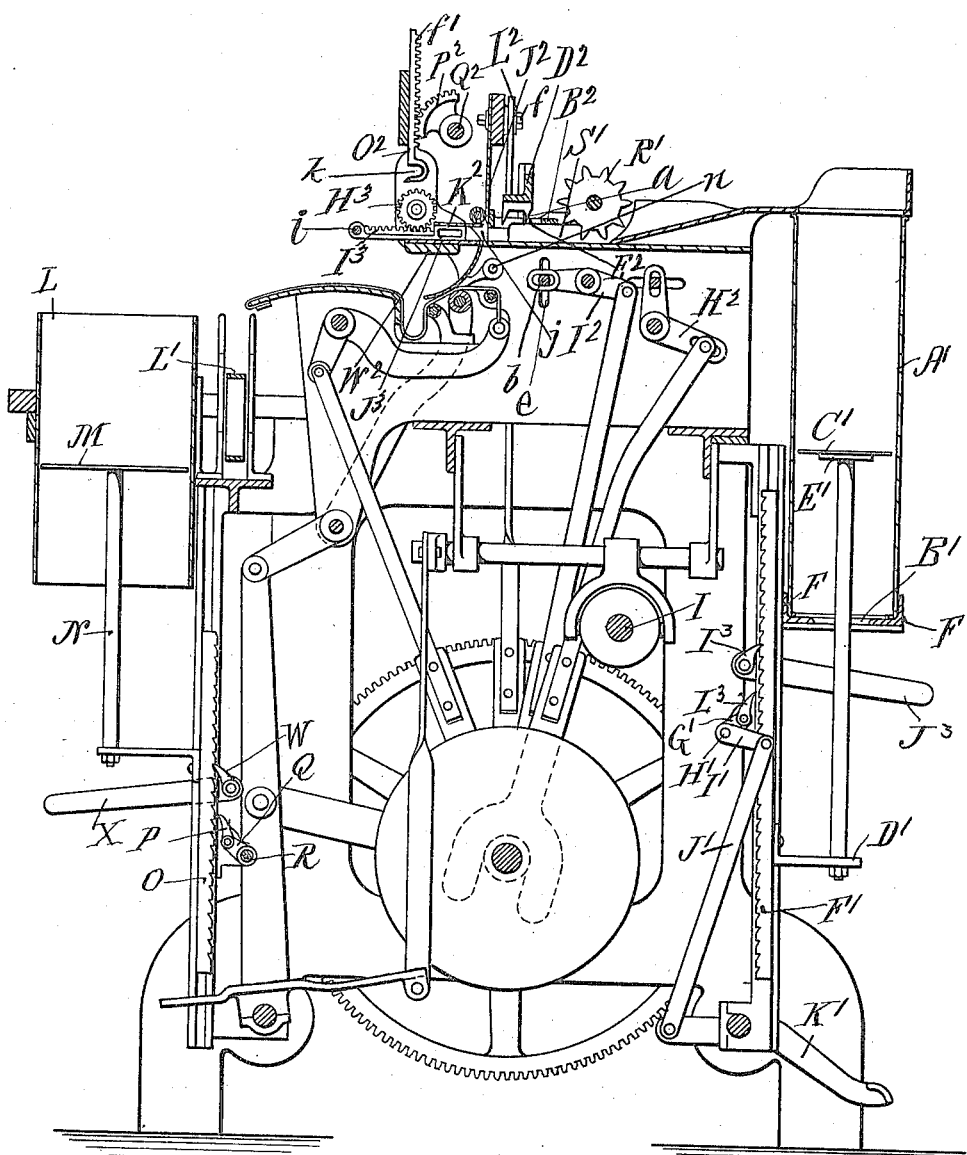
Figure 6:
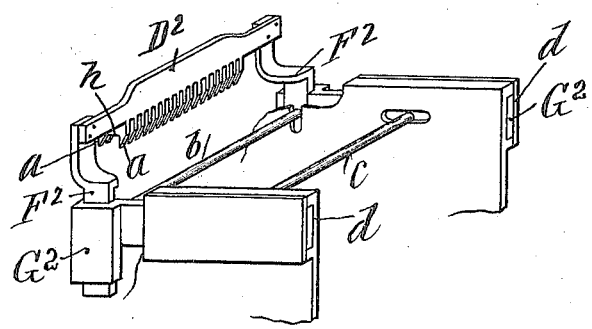
Figure 7:
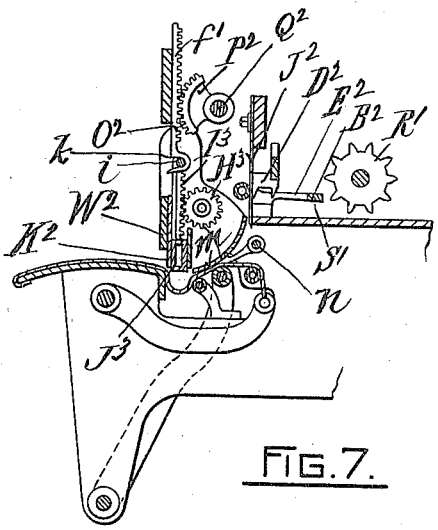
Figure 8:
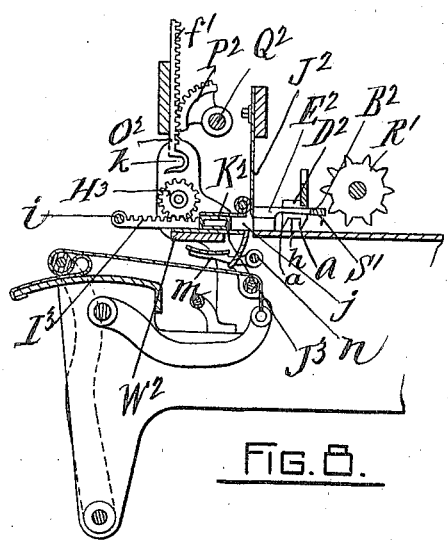
Figure 9:
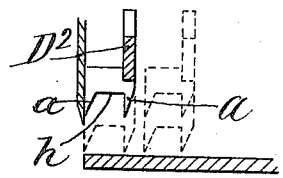
Figures 10, 11:
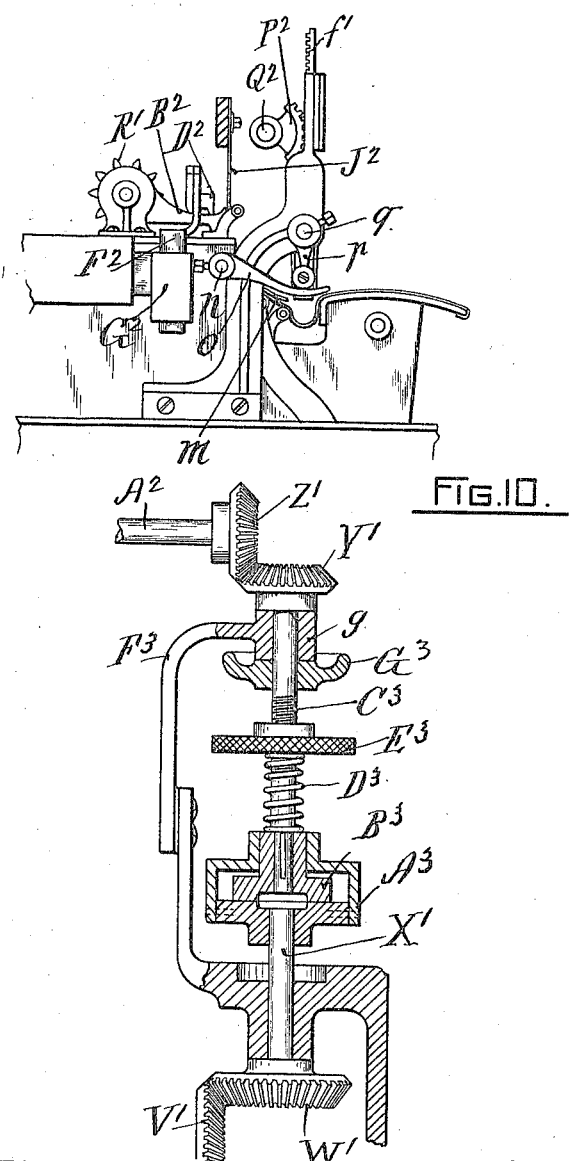

In the accompanying drawing: Figure 1 represents a front view of the machine. Fig. 2 represents a view of the right hand side of the same. Fig. 3 represents a rear view with the filler feeding box removed. Fig. 4 represents a top view of the machine. Fig. 5 represents a central vertical section. Fig. 6 represents a perspective view of the comb for feeding the fillers forward. Figs. 7 and 8 are detail vertical sections showing the feeding and bunch forming mechanism. Fig. 9 is a detail section illustrating the movement of the comb for feeding the fillers forward. Fig. 10 is a detail side view showing the means for guiding certain sliding members of the machine. Fig. 11 represents an axial section of the frictional means employed for operating the mechanism for feeding the fillers forward to the receiving chamber.

The improved machine for sizing the fillers and rolling the binders thereon consists of a frame A in which is mounted a driving shaft B. On the driving shaft is a fixed driving pulley C and a loose pulley D. Extending parallel with the driving shaft B is a clutch shaft E which is driven from the driving shaft B by means of a pinion G and a gear H. Also parallel with the driving shaft B is a cam shaft I and this cam shaft is driven from the clutch shaft E by a pinion J and a gear K.

The binders are placed in a box L, see Figs. 1 and 4, on a piston or supporting plate M. The binders are spread flat on this piston or plate. Means is provided for raising the piston or plate M so as to keep the stack of binders substantially even at the upper end with the top of the box, and this means consists of a rod N which supports the piston or plate M and a ratchet tooth slide O which is fed upward by a pawl P which is pivoted to an arm Q attached to a rock shaft R, from which connection is made to an operating lever S by means of an arm T, connecting rod U and an arm V, see Fig. 2. The rod N is attached at its lower end to a bracket which in turn is attached to the tooth slide O. The pawl W which is controlled by the hand lever X serves to hold the piston or plate M in its various adjusted positions. The operator by moving the lever S may raise the plate or piston M step by step, the pawl W dropping into one tooth after another to hold the plate in elevated position. By this means the binders are made readily accessible to the operator.

The fillers from which the bunches are made are held in a removable box $A^1$. This box is supported by a shelf formed by two strips of angle iron F, F which are attached to the supporting frame. A number of boxes of fillers may be placed on this angle iron support preparatory to their being used to supply the place of an emptied box. Each box is provided at its bottom with an opening $B^1$ over which is placed a loose plate $C^1$ on which the fillers are placed. The loose plate $C^1$ in each box is adapted to be elevated as the fillers are removed so as to keep the top of the stack of the fillers substantially level with the top of the box. For elevating the plates $C^1$ there is a piston $E^1$ which enters the opening $B^1$ in the bottom of the box and engages the under face of the plate $C^1$ and serves as a support for raising the same. Said piston is carried by a bracket $D^1$ secured to a sliding bar $F^1$. The sliding bar $F^1$ is raised by means of a pawl $L^3$ which is pivoted to an arm $G^1$ which in turn is secured to a pivot rod $H^1$. An arm $I^1$ carried by the rod is connected to a link $J^1$ and the link is connected to a pedal lever $K^1$. The feeding operator by moving the pedal lever raises the arm $G^1$ which through the pawl $L^3$ raises the slide $F^1$, the bracket $D^1$ and through the piston $E^1$ the plate $C^1$. The ratchet tooth slide $F^1$ is held in its various elevated positions by means of a pawl $I^3$ which is connected to a hand lever $J^3$. The purpose of the hand lever is to release the pawl so that the piston may be lowered.

The prepared fillers are taken from the box $A^1$ by the feeding in operator and pushed forward over the table $Q^1$ to the spur roll $R^1$ which is rotated for drawing the fillers forward and forcing them into the throat $S^1$ by means of a yielding driving mechanism. This driving mechanism consists of a spur gear $T^1$ carried by the clutch shaft E, which spur gear meshes with a gear $U^1$ on a stub shaft. A beveled gear $V^1$ is attached to the stub shaft carrying the gear $U^1$ and this beveled gear meshes with a beveled gear $W^1$ upon the lower end of the upright shaft $X^1$. At the upper end of this shaft is an oil chamber $A^3$ within which is placed a friction disk $B^3$. Said disk is loosely splined on the shaft $C^3$ and is pressed down by means of a spring $D^3$ and nut $E^3$ which are mounted on the shaft $C^3$. This causes the faced surface of the friction disk $B^3$ to contact with a faced surface of a disk on the end of the shaft $X^1$ or the lower wall of the oil chamber. By adjusting the nut $E^3$ the degree of friction desired between the friction surfaces may be obtained. The upper end of the shaft $C^3$ is supported by a bracket $F^3$, the bearing $g$ of which is held between the collars $G^3$ and the hub of the bevel gear $Y^1$. The bevel gear is attached to the upper end of the shaft and engages a beveled gear $Z^1$ upon the end of the shaft $A^2$ which carries the spur roll $R^1$. Through this guiding mechanism, it will be apparent that the spur roll is yieldingly rotated and the pressure of the spur roll on the filler as it feeds it forward can be varied by adjusting the nut $E^3$ which increases or decreases the friction between the disk $B^3$ and the wall of the oil chamber, depending upon which way the nut $E^3$ is turned. The fillers after leaving the spur roll $R^1$ are carried forward to the receiving chamber by means of a feeding and compressing comb $D^2$ which is provided on its under face with two rows of downwardly projecting spurs $a$, $a$, with intermediate compressing surfaces $h$. This comb passes through the spaces $E^2$, $E^2$ into the throat $S^1$. The feeding comb $D^2$ is attached to the vertical sliding end pieces $F^2$, $F^2$ which are connected to each other by means of a tie-rod $b$ so that the whole will constitute a rigid structure. The said end pieces $F^2$ are adapted to slide up and down in sliding bars $G^2$, $G^2$ which are connected together by means of a tie rod $c$. The sliding bars are held in guideways $d$, $d$, of the frame of the machine. The feeding and compressing comb $D^2$ is reciprocated horizontally by means of the slotted arm $H^2$ and its operating cam on the cam shaft, while the up and down movements are imparted to said comb by means of the arm $I^2$ and its operating cam. The tie rod $b$ moves up and down in a slot $e$ of the frame. From the above, it will be apparent that the feeding cone has in effect four motions, a forward movement while in engagement with the filler compressing the same, an upward movement out of contact with the filler, a return movement and thence a downward movement into contact with the filler. The compressing surface of the comb serves to compress the filler to a less thickness or depth than when in its normal passage through the throat $S^1$ and this causes the filler to readily enter the receiving chamber $j$. Through the operation of the spur roll and the feeding and compressing comb, the fillers are compressed into the receiving chamber.

The fillers in the receiving chamber $j$ are separated from the fillers in the throat $S^1$ so as to form the bunch by a knife $J^2$. The knife $J^2$ is secured to the standard $L^2$ by a pivot bolt $f$, and said knife is operated by a cam $M^2$ through a connecting rod $N^2$. After the fillers in the receiving chamber have been severed from the fillers in the throat, said receiving chamber is turned to discharging position so as to discharge the formed bunch on to a binder on the wrapping apron, and a plunger forming the bottom of the chamber is operated to discharge the bunch. This is accomplished as follows:—The sliding hook $O^2$ is carried by a bar having a rack $f^1$ which engages a segment gear $P^2$ on the rock shaft $Q^2$ and this rock shaft is operated from a cam on the cam shaft I by means of a connecting rod $R^2$, a lever $S^2$, a connecting rod $T^2$, and an arm $U^2$. The bar supporting the hook slides in a guideway in the frame. The bar $W^2$ forms a carrier slide for the member $K^2$ and this member $K^2$ contains the receiving chamber $j$. The bar is mounted to oscillate in bearings $h'$, $h'$, see Fig. 1, and this bar is swung so as to move the receiving chamber to discharging position by means of a gear $V^2$ attached to the projecting end $r$ of the bar $W^2$. A segment gear $X^2$ meshes with the gear $V^2$. An arm $Y^2$ is connected to the segment gear and this arm is oscillated by a rod $Z^2$ which coöperates with a cam on the cam shaft, see Fig. 2. The gears $H^3$, $H^3$ engage the racks $I^3$, $I^3$ of the discharging plunger $J^3$ for the filler receiving chamber, and these gears are actuated so as to hold the plunger retracted or in its backward position by means of spiral springs $K^3$, $K^3$. When the receiving chamber is turned from the position shown in Fig. 8 to the position shown in Fig. 7 the cross bar $i$ on the plunger will enter the opening $k$ of the hook $O^2$ and then the downward movement of the bar supporting the hook O² through the oscillation of the segment P² will effect a downward movement of the plunger against the upward resilient action of the springs K³, K³. When the receiving chamber is turned so as to disengage the plunger from the hook O² then the plunger will be drawn backward through the action of the springs K³, K³, and the receiving chamber is then ready to receive another bunch of fillers.

The fillers in the receiving chamber are prevented from escaping during the swinging movement of the chamber by means of the curved guard m, see Figs. 7 and 8. This guard is secured to the rock shaft n and is thrown upward to the position shown in Fig. 8 by suitable spring means, and is carried down to the position shown in Fig. 7 by means of the arm o, secured to the outer end of the shaft n, and the arm p secured to the projecting end of the shaft r of the bar W². The apron for wrapping the binder on the former bunch of fillers is of the usual construction and description thereof is not thought necessary.

The cigar bunches when properly bound, are discharged from the binding mechanism to the endless belt L¹ which is driven from the cam shaft I by means of the scored pulley M¹, the idler pulleys N¹, N¹, the pulley O¹ and the belt P¹.

The operation of the machine is thought to be obvious from the above description. The binders are removed from the supporting box L and are placed on the apron ready to receive the bunch of fillers when discharged from the receiving chamber. The feeding in operator takes the fillers from the box A¹ and feeds the same to the spur roll which yieldingly feeds the fillers to the receiving throat S¹. This spur roll is yieldingly driven and when the fillers have filled the throat and are sufficiently pressed therein, the rotation of the roll will cease. This spur roll, therefore, serves as a means for conveying the fillers to the receiving throat so that they will be uniformly pressed therein. The feeding and compressing comb engages the fillers in the throat and presses and feeds the same along into the receiving chamber. As soon as the receiving chamber is filled, the fillers therein are severed from the remaining fillers in the throat, after which the receiving chamber is swung to discharging position and the plunger is operated to discharge the bunch on to the binder on the wrapping apron, after which the receiving chamber is swung again to normal position for receiving the fillers to form the next bunch.

We claim as our invention:

1. In a cigar bunch machine, the combination of a rotary spur roll for receiving and feeding the fillers, means for operating said roll including a driving shaft having coöperating friction disks, an oil chamber surrounding said disks, means for yieldingly pressing said friction disks into engagement, and means for varying the pressure of the disks against each other.

2. In a cigar bunch machine, the combination of a rotary spur roll for receiving and feeding the fillers, means for operating said roll including a driving shaft, said driving shaft being formed in sections, friction disks carried by the adjacent ends of said shaft, one of said disks being free to move longitudinally of the section supporting the same, a spring surrounding said section of the shaft and forcing said disks into contact, said shaft being threaded, and a nut carried by said threaded shaft for varying the tension of the spring on the disks.

3. In a cigar bunch machine, the combination of a rotary spur roll for receiving and feeding the fillers, means for operating said roll including a driving shaft, said driving shaft being formed in sections, friction disks carried by the adjacent ends of said shaft, one of said disks being free to move longitudinally of the section supporting the same, a spring surrounding said section of the shaft and forcing said disks into contact, said shaft being threaded, a nut carried by said threaded shaft for varying the tension of the spring on the disks, and an oil chamber surrounding said disks.

4. In a cigar bunch machine, the combination of a feeding comb having spurs and intervening compressing surfaces, vertically sliding end pieces connected to said comb, horizontally sliding bars provided with guide ways for said end pieces, and means for vertically reciprocating said end pieces and for horizontally sliding said bars.

5. In a cigar bunch machine, the combination of the spur roll for feeding the fillers forward, the bars which form the throat through which the fillers are forced by the action of the spur roll, the receiving chamber, and the feeding comb adapted for compressing the fillers vertically preparatory to their entrance into the receiving chamber.

6. In a cigar bunch machine, the combination of a table, bars located above said table and forming a receiving throat, means for feeding the fillers through said throat to the receiving chamber including a spur roll, and a feeding comb adapted for compressing the fillers vertically, preparatory to the delivering of the same to the receiving chamber.

7. In a cigar bunch machine, the combination of a table, bars located above said table and forming a receiving throat, means for feeding the fillers through said throat to the receiving chamber including a spur roll, a feeding comb adapted for compressing the fillers vertically, preparatory to the delivering of the same to the receiving chamber, and means for yieldingly driving said spur roll.

8. In a cigar bunch machine, the combination of a table, bars located above said table and forming a receiving throat, means for feeding the fillers through said throat to the receiving chamber including a spur roll, a feeding comb adapted for compressing the fillers vertically, preparatory to the delivering of the same to the receiving chamber, and means for moving said comb vertically and horizontally for compressing and delivering the fillers.

9. In a cigar bunch machine, the combination of a table, bars located above said table and forming a receiving throat, means for feeding the fillers through said throat to the receiving chamber including a spur roll, a feeding comb adapted for compressing the fillers vertically preparatory to the delivering of the same to the receiving chamber, means for moving said comb vertically and horizontally for compressing and delivering the fillers, and means for yieldingly driving said spur roll.

RICHARD A. BRIGHT.
ALLEN J. COLWELL.

Witnesses:
SOCRATES SCHOLFIELD,
HOWARD A. LAMPREY.

Copies of this patent may be obtained for five cents each, by addressing the "Commissioner of Patents, Washington, D. C."